(12) United States Patent
Marchal et al.

(10) Patent No.: US 10,160,343 B2
(45) Date of Patent: Dec. 25, 2018

(54) METHOD FOR MANAGING THE COOLING OF A BATTERY WITH ADJUSTABLE COOLING THRESHOLDS

(71) Applicant: RENAULT s.a.s., Boulogne-Billancourt (FR)

(72) Inventors: Caroline Marchal, Montigny le Bretonneux (FR); Philippe Recouvreur, Montrouge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 477 days.

(21) Appl. No.: 14/787,389

(22) PCT Filed: Apr. 28, 2014

(86) PCT No.: PCT/FR2014/051015
§ 371 (c)(1),
(2) Date: Dec. 18, 2015

(87) PCT Pub. No.: WO2014/177800
PCT Pub. Date: Nov. 6, 2014

(65) Prior Publication Data
US 2016/0107537 A1    Apr. 21, 2016

(30) Foreign Application Priority Data

May 2, 2013   (FR) ..................... 13 54056

(51) Int. Cl.
| B60L 11/18 | (2006.01) |
| H01M 10/625 | (2014.01) |
| H01M 10/633 | (2014.01) |
| H01M 10/613 | (2014.01) |

(52) U.S. Cl.
CPC ....... *B60L 11/1874* (2013.01); *B60L 11/1861* (2013.01); *B60L 11/1877* (2013.01);
(Continued)

(58) Field of Classification Search
CPC .............. B60L 11/1874; B60L 11/1861; B60L 11/1877; B60L 2240/545; H01M 10/613;
(Continued)

(56) References Cited

U.S. PATENT DOCUMENTS

| 6,653,002 B1* | 11/2003 | Parise | ................... | B01F 5/0614 |
| | | | | 136/200 |
| 2003/0118891 A1* | 6/2003 | Saito | ...................... | B60L 1/003 |
| | | | | 429/62 |

(Continued)

FOREIGN PATENT DOCUMENTS

| EP | 1 876 051 A1 | 1/2008 | |
| EP | 1876051 A1 * | 1/2008 | ............ B60L 3/0046 |
| WO | 2012/079983 A2 | 6/2012 | |

OTHER PUBLICATIONS

International Search Report dated Jul. 15, 2014 in PCT/FR14/051015 Filed Apr. 28, 2014.
(Continued)

*Primary Examiner* — Mary Cheung
(74) *Attorney, Agent, or Firm* — Oblon, McClelland, Maier & Neustadt, L.L.P.

(57) ABSTRACT

A method for managing a battery located in a motor vehicle includes cooling the battery when a data item indicative of the temperature of the battery exceeds a first threshold, stopping the cooling of the battery when the data item indicative of the temperature of the battery drops below a second threshold, notably lower than the first threshold, and adjusting at least one of the first and second thresholds.

10 Claims, 3 Drawing Sheets

(52) U.S. Cl.
CPC ....... *H01M 10/613* (2015.04); *H01M 10/625* (2015.04); *H01M 10/633* (2015.04); *B60L 2240/545* (2013.01); *Y02T 10/7005* (2013.01); *Y02T 10/705* (2013.01); *Y02T 10/7044* (2013.01)

(58) Field of Classification Search
CPC . H01M 10/625; H01M 10/633; Y02T 10/705; Y02T 10/7005; Y02T 10/7044
See application file for complete search history.

(56) References Cited

U.S. PATENT DOCUMENTS

| | | | |
|---|---|---|---|
| 2006/0080986 A1* | 4/2006 | Inoue | B60H 1/00057 62/259.2 |
| 2007/0212598 A1* | 9/2007 | Iida | H01M 10/48 429/62 |
| 2008/0012535 A1 | 1/2008 | Takatsuji et al. | |
| 2008/0076011 A1* | 3/2008 | Emori | B60L 3/0046 429/62 |
| 2010/0304193 A1 | 12/2010 | Karlsson et al. | |
| 2011/0049977 A1* | 3/2011 | Onnerud | B60L 3/0046 307/9.1 |
| 2012/0049802 A1* | 3/2012 | Barsukov | G01R 31/3651 320/136 |
| 2014/0012445 A1 | 1/2014 | Fleckenstein et al. | |
| 2014/0072839 A1* | 3/2014 | Park | H01M 2/345 429/50 |

OTHER PUBLICATIONS

French Search Report dated Jan. 8, 2014 in French Application No. 1354056 Filed May 2, 2013.

* cited by examiner

METHOD FOR MANAGING THE COOLING OF A BATTERY WITH ADJUSTABLE COOLING THRESHOLDS

TECHNICAL FIELD OF THE INVENTION

The invention relates to the field of management of batteries that have to be cooled.

The invention more particularly relates to a method for managing a battery, which preferably is disposed in a motor vehicle.

The invention also relates to a vehicle implementing the management method.

PRIOR ART

In a fully electric vehicle or in a hybrid vehicle combining propulsion modes by electric motor and by internal combustion engine, a battery is used to assure the propulsion functions of the vehicle. In accordance with the technology of such a battery, this must operate within a given temperature range in order to limit the degradation of said battery.

Document WO2012/003209 describes such operation by developing specific means for keeping the battery between 18° C. and 45° C. during operation thereof in order to prevent excessively quick degradation.

In practice, different degradations of batteries used in accordance with this type of operation have been noted.

OBJECT OF THE INVENTION

The objective of the present invention is to propose a solution that makes it possible to limit the degradations of a battery over the service life thereof.

This objective is achieved in particular by a method for managing a battery, which in particular is disposed in a motor vehicle, said method including:
- a step of cooling of the battery when a data item representative of the temperature of the battery exceeds a first threshold,
- a step of stopping the cooling of the battery when the data item representative of the temperature of the battery drops below a second threshold, which in particular is lower than the first threshold,
- a step of adjustment (E3) of at least one of the first and second thresholds.

The step of adjustment of at least one of the first and second thresholds advantageously includes a step of determination of a driving behavior selected from a first driving type and a second driving type, which engages the battery more than the first driving type, in particular by comparison of at least one predetermined driving threshold with at least one driving information item. When the determined driving behavior is of the second driving type, the first threshold and/or the second threshold are/is preferably lowered by the step of adjustment. In addition, when the determined driving behavior is of the first driving type, the first and/or second thresholds are/is preferably adjusted upwardly by the step of adjustment so as to reduce the energy expenditure of the vehicle.

The step of adjustment of at least one of the first and second thresholds preferably includes a step of determination of a state of the battery, in particular the age thereof or the state of health thereof.

For example, the step of adjustment includes the interrogation of a table of which an input is the determined state of the battery, said table providing at the output a new first threshold to be used in the step of cooling and/or a new second threshold to be used in the step of stopping the cooling.

In accordance with one embodiment the method includes a step of determination of a loss of real capacity of the battery, the step of adjustment of at least one of the first and second thresholds being dependent on said loss of real capacity of the battery. It should be noted that in the present application the real capacity of the battery and state of charge thereof are two separate things, the capacity being the electrical charge that can be provided by the battery after a complete discharge cycle from a state of maximum charge.

For example, the method includes a step of determination of a loss of theoretical capacity of the battery, the step of adjustment of at least one of the first and second thresholds taking into consideration said loss of theoretical capacity.

In accordance with one embodiment, the battery having a guaranteed service life determined by theoretical conditions of use of the battery, the step of adjustment includes a step of comparison of the determined loss of real capacity and of the determined loss of theoretical capacity, such that the adjustment of at least one of the first and second thresholds makes it possible to ensure the guaranteed service life.

The method advantageously includes a cycle, during which:
- a step of learning of the behavior of the battery according to the state of charge and temperature thereof is performed, during a time range associated with the cycle,
- at the end of the time range a loss of real capacity of the battery is determined on the basis of the results of the step of learning,
- the step of adjustment of at least one of the first and second thresholds includes the establishment of a correction to be applied to said at least one of the first and second thresholds taking into consideration at least the determined loss of real capacity of the battery.

The correction to be applied is preferably dependent on a comparison between the determined loss of theoretical capacity and the determined loss of real capacity.

In addition, the method is repeated throughout the service life of the battery, such that each cycle end induces the adjustment of at least one of the first and second thresholds for the following cycle.

In accordance with a particular embodiment the step of learning comprises the construction of a set of parameters, each parameter comprising a first information item relating to one or more states of charge, in particular a state of charge range, a second information item relating to one or more temperatures, in particular a temperature range, and a third time information item, in particular a percentage, representative of the time during which the battery has operated in accordance with the first information item and the second information item during the time range, and at the end of the time range a corresponding coefficient of degradation is applied to each of the third information items so as to determine the loss of real capacity of the battery.

The invention also relates to a motor vehicle comprising a battery, at least one temperature sensor or monitor configured so as to measure a value representative of the temperature of the battery, a system for cooling the battery, and a calculation system connected to the temperature sensor and to the cooling system and comprising software and/or hardware means for implementing the management method as described.

The invention also relates to a data storage medium readable by a computer, on which a computer program comprising computer program code means for implementing the method as described is recorded.

The invention also relates to a computer program comprising a computer program code means suitable for carrying out the method as described when the program is executed by a computer.

BRIEF DESCRIPTION OF THE DRAWINGS

Further advantages and features will become clearer from the following description of particular embodiments of the invention given by way of non-limiting example and shown in the accompanying drawings, in which.

DESCRIPTION OF PREFERRED
EMBODIMENTS OF THE INVENTION

The method described hereinafter differs from the prior art in particular in that a temperature threshold associated with the cooling logic of the battery is adapted over the course of the life of said battery. In fact, studies performed within the scope of the present invention have shown that the cooling logic must be adapted in accordance with the use of the battery, and therefore the aging thereof, if it is desired to limit the degradation of said battery.

Figure 1:
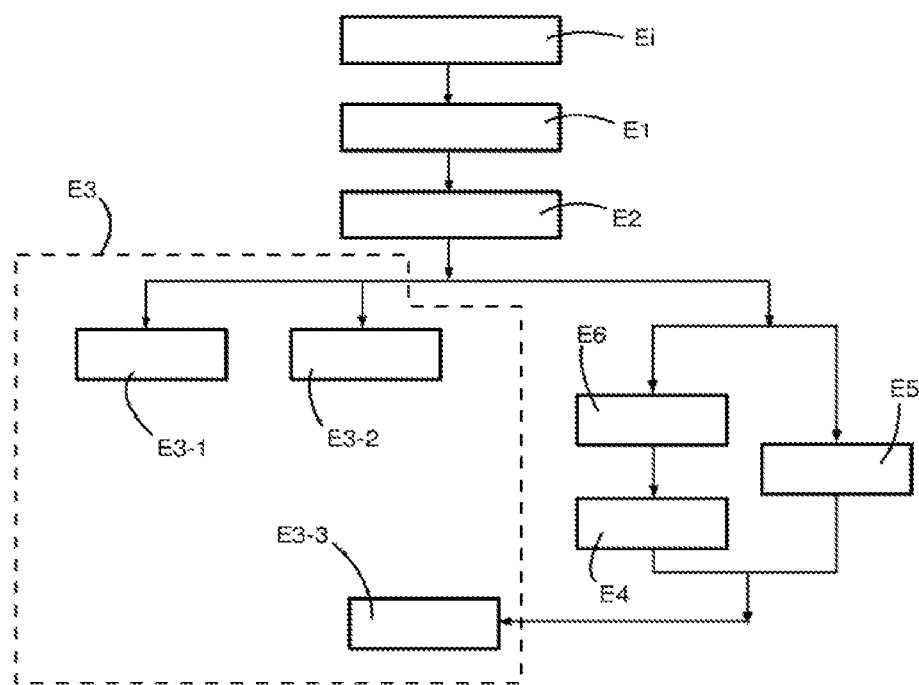
FIG. 1 illustrates different steps of implementation of a method for managing a battery, FIG. 2 schematically shows a vehicle provided with means able to implement the management method.
Figure 2:
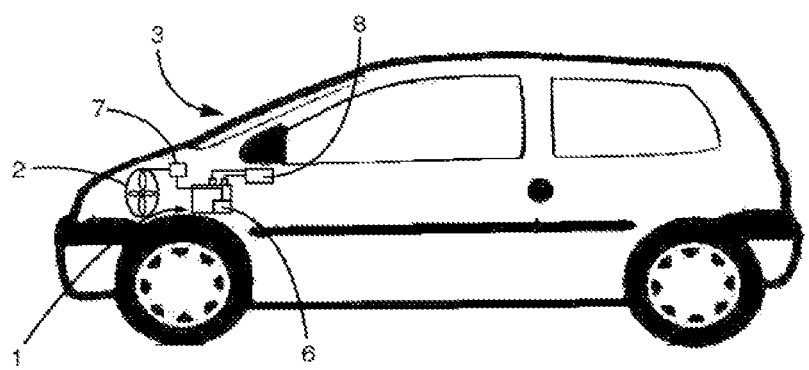

FIG. 1 illustrates the steps of a method for managing a battery 1, which is preferably disposed in a motor vehicle 3, and in particular, as illustrated in FIG. 2, is associated with a cooling system 2. The battery 1 can provide energy to a motor vehicle 3. In fact, the battery 1 can be a battery for propelling the vehicle 3. The propulsion is understood in the sense of setting the vehicle in motion, and the battery can thus transmit torque to the front suspension 4 and/or to the rear suspension 5 of the motor vehicle 3.

Although the present method is particularly suitable within the scope of a battery 1 of a motor vehicle 3 that is completely electric or is hybrid, it can be adapted to any type of battery having to be cooled at a given moment during use/operation thereof.

The method includes a step of cooling E1 of the battery 1 when a data item representative of the temperature of the battery 1 exceeds a first threshold, in particular a temperature threshold, and a step of stopping the cooling E2 of the battery 1 when the data item representative of the temperature of the battery 1 drops below a second threshold, in particular a temperature threshold. This second threshold is preferably lower than the first threshold. The step of cooling E1 can be implemented by starting the cooling system 2, and the step of stopping the cooling can be implemented by stopping the cooling system 2.

The data item representative of the temperature of the battery 1 can be delivered from a step of measurement of the temperature of the battery 1, for example by a temperature sensor 6 placed suitably on the battery 1.

In addition, the method comprises a step of adjustment E3 of at least one of the first and second thresholds. The notion of adjustment is understood as a modification applied to a current first threshold and/or to a current second threshold so as to adapt the method for managing the battery 1. For example, the method for managing the battery may include a step of initialization Ei in which the first and second thresholds are initialized, in particular at values determined for example by the manufacturer of the battery 1. These initialized values can be used once or more times during the implementation of steps E1 and E2 before the step of adjustment E3 is carried out. In other words, generally, at least one step of cooling E1 and at least one step of stopping the cooling E2 can be implemented before carrying out the step of adjustment E3. These steps E1 and E2 can be carried out for example during a phase of travel of the vehicle, the first and second thresholds then being adjustable such that the behavior of the cooling is different within the same phase of travel or between two different phases of travel spaced apart over time, for example spaced apart by a phase of parking of the vehicle. During a phase of travel the battery 1 is engaged in order to provide current, for example to a propulsion element 8 of the vehicle, or is recharged in a manner known to the person skilled in the art, for example using actuators of the vehicle, such as a braking system.

In fact, the step of adjustment E3 of at least one of the first and second thresholds may take into consideration the dynamic of aging of the battery 1 (put more simply, a use of the battery 1), that is to say the conditions of use of the battery, such as the engagement thereof, state of health thereof, loss of capacity thereof, etc. In other words, the step of adjustment E3 may take into consideration at least one data item making it possible to evaluate or to anticipate an aging of the battery 1. In other words, the step of adjustment E3 of at least one of the first and second thresholds may be dependent on data items relating to the aging of the battery 1.

In accordance with a first embodiment the step of adjustment E3 includes a step of determination E3-1 of a driving behavior selected from a first driving type and a second driving type, which engages the battery 1 more than the first driving type, in particular by comparison of at least one predetermined driving threshold with at least one driving information item, such as the average speed of the vehicle over a given time range. It is therefore clear that the step of adjustment E3 of at least one of the first and second thresholds takes into consideration the determined driving behavior. For example, if the determined driving behavior is of the second driving type, the first threshold and/or the second threshold are/is lowered by the step of adjustment E3 so as to trigger the cooling earlier and the stopping thereof later. In accordance with another example, if the determined driving behavior is of the first driving type, the first and/or second thresholds are/is adjusted upwardly by the step of adjustment E3 so as to reduce the expenditure of energy of the vehicle, or are/is not modified (to the detriment of the autonomy of the vehicle). This first embodiment is based on the fact that, depending on the driving type, the aging of the battery 1 of the vehicle 3 could be accelerated, and therefore the threshold or thresholds can be adjusted so as to limit the aging of the battery 1 to the best possible extent. Typically, the first driving type is associated with a slowed aging of the battery 1 in comparison with a third driving type representative of a driving standard defining a predetermined aging, and the second driving type is associated with a premature aging of the battery 1 in comparison with the third driving type. The severity of the cycles may be dependent for example on the battery temperature, the RMS power during travel (RMS=mean), the time spent traveling, etc., and the evaluation of the adjusted thresholds can be performed by control loop, mapping or by incrementation (or decrementation) of the threshold temperatures until the point of return to the reference situation (thresholds without adjustment).

In accordance with a second embodiment, the step of adjustment E3 includes a step of determination E3-2 of a state of the battery 1, in particular the age thereof or state of health thereof. In other words, the step of adjustment E3 of at least one of the first and second thresholds takes into consideration said determined state. For example, the step of adjustment E3 includes the interrogation of a table of which an input is the determined state of the battery 1, said table providing at the output a new first threshold to be used in the step of cooling E1 and/or a new second threshold to be used in the step of stopping the cooling E2.

The state of health of the battery 1, also referred to as SOH, is generally available from the controller of the battery 1, such as the CAN (controller area network). The use of the state of health of the battery is easy to implement in the sense that it uses predetermined maps. The person skilled in the art is able to determine these maps such that a first threshold to be used and/or a second threshold to be used are/is associated with each state of health value or a range of state of health values. The state of health of the battery is an indicator of the aging of the battery, however it is also indirectly an indicator of the increase of the internal resistance thereof and therefore the heating thereof. In order to prevent elevated temperatures in the battery, the thresholds should therefore be lowered with the reduction of the SOH.

With regard to the age of the battery 1, a service life of the battery 1 can be divided into a number of periods, each period associated with an age of the battery 1 including a first threshold value to be used and/or a second threshold value to be used. For example, each period relates to a year of operation of the battery 1. In this case, the thresholds can be defined in the following way:

$1^{st}$ year: first threshold=30° C. and second threshold=17° C.

$2^{nd}$ year: first threshold=29° C. and second threshold=16° C.

$3^{rd}$ year: first threshold=28° C. and second threshold=15° C.

Such a consideration of the age or of the state of health are solutions that are easy to implement. However, the use of simply the age presents the disadvantage of not taking into consideration the real behavior of the client, in particular the driver of the motor vehicle 3.

Thus, in accordance with a third embodiment, the method comprises a step of determination E4 of a loss of real capacity of the battery 1 and the step of adjustment of at least one of the first and second thresholds is dependent on said determined loss of real capacity of the battery 1. In other words the step of adjustment E3-3 of at least one of the first and second thresholds may then take into consideration said loss of real capacity. This makes it possible to take into consideration the use of the battery in order to act on the first and/or second thresholds, for example in order to ensure a good service life of the battery 1. This same process can be performed using the SOH of the battery (comparison of the progression of the real SOH in relation to the theoretical "normal" reference SOH).

In addition, in accordance with this third embodiment, the method may also include a step of determination E5 of a loss of theoretical capacity of the battery 1, and the step of adjustment E3-3 takes into consideration said determined loss of theoretical capacity. In fact, the loss of theoretical capacity is understood for a battery 1 in relation to a normal use of the battery determined by the manufacturer. Thus, it is possible for example to compare the determined loss of real capacity with the determined loss of theoretical capacity so as to determine a "drift" of use said to be "normal", for example of the vehicle provided with the battery, with real use, for example of the vehicle provided with the battery, in order to adapt the first threshold and/or the second threshold. This is even more true when the battery 1 is associated with a guaranteed service life defined by theoretical conditions of use of the battery 1, and in this case the step of adjustment E3-3 may include a step of comparison of the determined losses of theoretical and real capacity such that the adjustment of at least one of the first and second thresholds makes it possible to ensure the guaranteed service life.

In accordance with a particular implementation of the third embodiment, the method includes a cycle during which a step of learning E6 (FIG. 1) (this cycle may be a time range or period, etc.) of the behavior of the battery 1 according to the state of charge and temperature thereof is performed.

Figure 3:
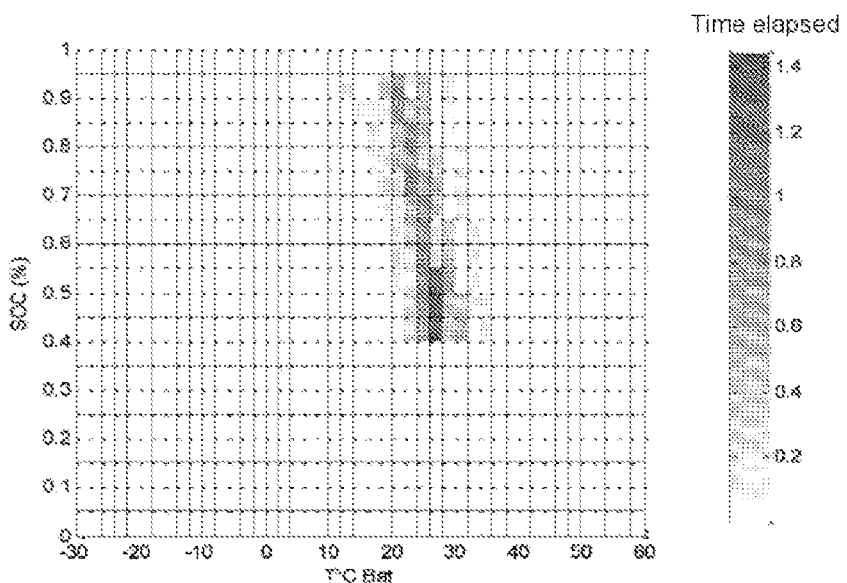
FIG. 3 shows a matrix of which each box corresponds to an intersection between a state of charge SOC range in percentage and a temperature range, each box being associated with a percentage representative of a time information item.

In accordance with a particular example, this step of learning E6 comprises the construction of a set of parameters, each parameter comprising a first information item relating to one or more states of charge, in particular a state of charge range, a second information item relating to one or more temperatures, in particular a temperature range, and a third time information item, in particular a percentage, representative of the time during which the battery 1 has operated in accordance with the first information item and the second information item during the time range or period. FIG. 3 illustrates such a constructed set of parameters present in the form of a matrix containing for example the time elapsed (in percentage) per state of charge range (SOC in percentage) and per temperature range (T ° C. Bat). Each box of the matrix illustrated in FIG. 3 represents a parameter. Each parameter is preferably unique, and its uniqueness is given by the combination of the associated first information item and second information item. These information items will make it possible to calculate the loss of real capacity of the battery and then to recalculate the temperature thresholds to be adapted in order to obtain the desired progression of capacity. This more complex method thus makes it possible to calculate adapted thresholds more precisely than the methods proposed previously.

The notion of a time range provides an information item regarding a duration of time in a manner unrelated to other ranges, and the notion of a time period corresponds to a range that is repeated over time.

In a manner generally applicable to the third embodiment, a loss of real capacity of the battery is determined at the end of the time range or period (step E4) on the basis of the results of the step of learning E6.

Figure 4:
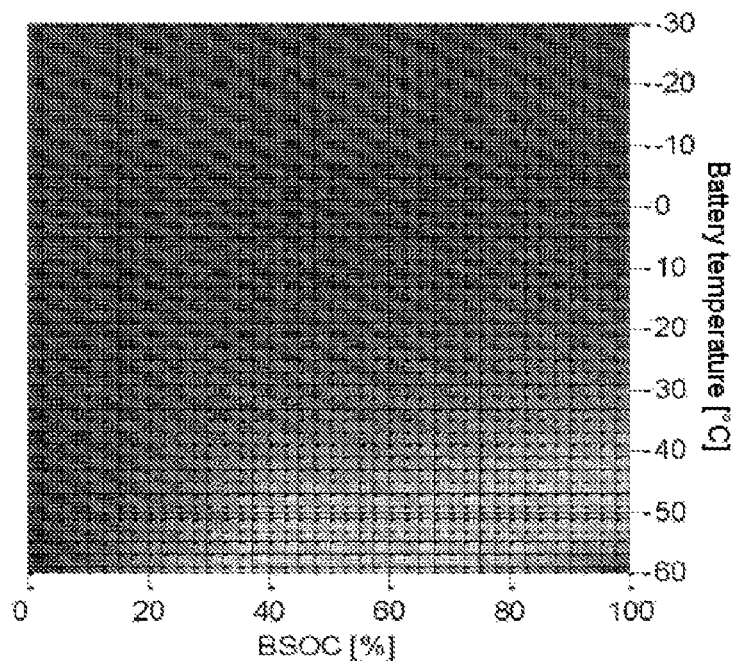
FIG. 4 illustrates a degradation matrix of which each box corresponds to an intersection between a state of charge SOC range in percentage and a temperature range, each box being associated with a coefficient of degradation of a battery.

Within the scope of the particular example of the step of learning (E6), a corresponding coefficient of degradation is applied at the end of the time range or period to each of the third information items so as to evaluate the loss of real capacity of the battery. More particularly, in particular for the time range or period associated with the cycle, a set of degradation coefficients each corresponding to a parameter of the set of parameters is associated thereto. FIG. 4 illustrates a particular embodiment in the form of a matrix containing, for each box, a degradation coefficient associated with a state of charge range and with a temperature range. The loss of real capacity of the battery can then be evaluated by multiplying the two matrices and by calculating the sum of each third information item multiplied by an associated degradation coefficient. A calendar capacity loss and a capacity loss in cycles are calculated on the basis of the information obtained (FIGS. 3 and 4 and the age and/or internal resistance of the battery and the cycled kWh), and this makes it possible to calculate the real capacity of the battery.

In a manner generally applicable to the third embodiment, the step of adjustment E3-3 of at least one of the first and second thresholds includes the establishment of a correction to be applied to said at least one of the first and second thresholds taking into consideration at least the determined loss of real capacity of the battery 1.

It is clear from that which has been described above that the correction to be applied may also be dependent on a comparison between the determined loss of theoretical capacity and the determined loss of real capacity. In fact, on the basis of the matrices obtained, it is possible to recreate the matrices required in order to rejoin the reference capacity curve at a given age, and the spacing between these matrices may translate into a temperature threshold delta for the triggering and/or stopping of the cooling.

Figure 5:
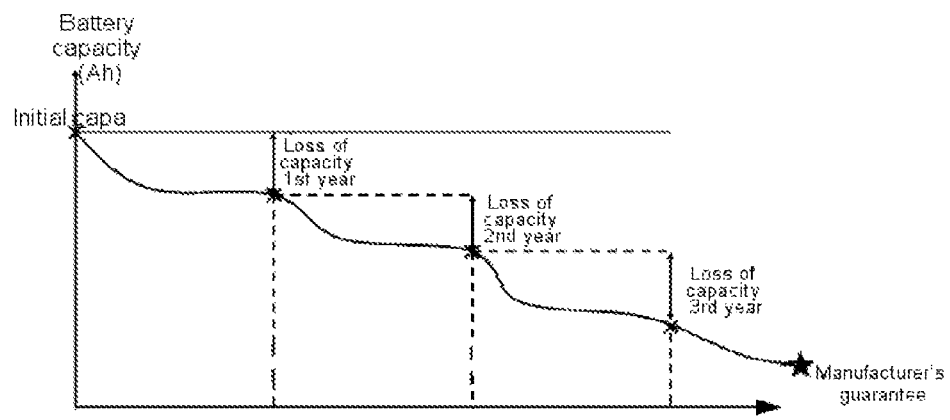
FIG. 5 illustrates a curve representative of the capacity of a battery over time (in particular during the service life thereof)

In fact, the step of determination E5 of the loss of theoretical capacity may correspond to the establishment, on the basis of a predetermined curve, of said corresponding loss. Such a curve may be that illustrated in FIG. 5, which shows the progression of the capacity of the battery in Ah on the basis of time in years (the cycle then being associated with a repetitive time range representative of a year). This pre-established curve may be provided, for example, for a given vehicle, under normal use conditions defined by the manufacturer, for example on the basis of a test bench.

The process is preferably repeated throughout the service life of the battery 1, such that each cycle end induces the adjustment of at least one of the first and second thresholds for the following cycle. This makes it possible to induce a readjustment at different stages of the life of the battery, these stages being spaced apart over time.

Figure 6:
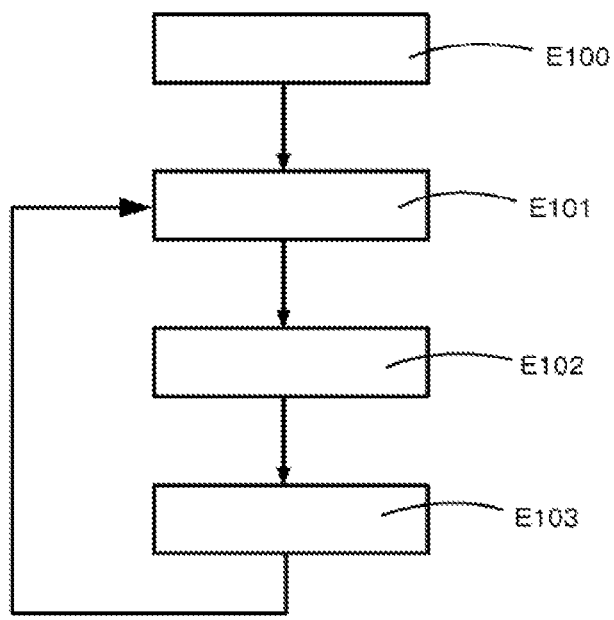
FIG. 6 illustrates a particular embodiment of a cycle of the management method.

FIG. 6 illustrates a preferred sequence of the management method, of which the cycle is repeated each year marking the anniversary of the commissioning of the battery 1. In a first phase E100 an initialization is performed for the first year of operation of the battery 1 by determining a first threshold at 28° C. and a second threshold at 15° C., these two values being provided by the car manufacturer.

In a second phase E101, a client uses its vehicle throughout the first year, during which the stage of learning E6 described above is implemented.

At the end of the first year, i.e. at the moment at which a new cycle will be initiated, a third, balance phase E102 is implemented. This balance comprises:
the evaluation of the loss of real capacity of the battery during the past year,
the comparison of the loss of real capacity with a pre-established loss of theoretical capacity for a year similar to that just passed,
the evaluation of a correction to be applied and the determination of two new first and second thresholds on the basis of the current thresholds.

Following the balance phase E102, the new first and second thresholds E103 are applied within the scope of a new year, and the method thus loops back to the second phase E101 so as to perform a new learning for the new year underway.

In the preferred sequence of the management method above, the process is simplified by a recalibration of the thresholds only at the end of each year, however this could be performed at regular intervals (or otherwise). In the case of regular calculation, it is possible to take into consideration reference matrices dependent on the seasons (or on the average external temperature since the last interval change, the reset of the learning, i.e. step E6, being performed for example only on anniversaries) so as not to induce incorrect threshold recalibrations. In fact, this then makes it possible to avoid inconsistency between the period of collection of data items of the time matrix and of the reference matrix.

Generally, it is possible to increase or to lower the first threshold and/or the second threshold, but of course in certain cases there are limits, in particular for the lower limit, according to the performance of the battery when cold.

With regard to the way of calculating the temperature correction, i.e. the adjustment of the first and/or second thresholds, a number of methods can be used: digital resolution, dichotomy, PID (proportional integral derivative for corrector or regulator), etc.

In the management method it has been considered that the cycle degradation of the client corresponded to the guarantee reference degradation of the battery 1. Nevertheless, the calculation of the target temperature could be refined by not directly considering as guarantee degradation reference the calculation delivered from the sum of the multiplication of the matrices (calendar degradation) described above, but the total guarantee reference degradation taking into account separately the cycle degradation and the calendar degradation.

The term "cycle degradation" means the loss per cycle because these are calculated differently from 'calendar' losses. The calendar losses exist even if the client does not use its battery, i.e. it is a given degradation mode. If the client uses its battery then it is necessary to add the losses per cycle to the calendar losses.

The method as described is very advantageous in the sense that, in accordance with the client behavior, the cooling thresholds are adjusted whilst fulfilling guarantee objectives in terms of battery capacity. This makes it possible in addition to optimize the cost of the cooling and therefore to optimize the autonomy.

Of course, the invention also relates to a motor vehicle 3 (FIG. 2) comprising a battery 1, at least one temperature sensor or monitor 6 configured so as to measure a value representative of the temperature of the battery 1, a system 2 for cooling the battery 1, and a calculation system 7 connected to the temperature sensor 6 and to the cooling system 2 and comprising software and/or hardware means for implementing the management method as described. In particular, the software and/or hardware means may comprise an element for each step of the management method, each element then being configured so as to perform the step with which it is associated.

In addition, a data storage medium readable by a computer on which a computer program is recorded may comprise computer program code means for implementing a method for managing the battery (or steps thereof) as described above.

In addition, a computer program may comprise a computer program code means suitable for carrying out the method for managing the battery (or steps thereof) as described above, in particular when the program is executed by a computer.

The storage medium and/or the computer program may form part of the vehicle as described.

The different embodiments, in particular the first, second and third embodiments can be considered individually or in combination.

In accordance with an alternative, the real state of health of the battery may be known for a given moment of the life of the battery, in particular on the basis of the CAN, and the theoretical state of health provided by manufacturer data may be known for the same given moment on the basis of a predetermined map. It is possible to transform these states of health into loss of real capacity and loss of theoretical capacity in order to use these within the scope of the adjustment as described, and vice versa the loss of capacity may be translated into SOH.

The invention claimed is:

1. A method for managing a battery disposed in a motor vehicle, said method comprising:
    cooling the battery when a data item representative of a temperature of the battery exceeds a first threshold,
    stopping the cooling of the battery when the data item representative of the temperature of the battery drops below a second threshold, the second threshold being lower than the first threshold,
    determining a loss of real capacity of the battery by determining, over a time range, states of charge and temperature of the battery during operation and a percentage of time over the time range that the battery operated at each of the states of charge and temperature, and
    adjusting at least one of the first and second thresholds depending on said loss of real capacity of the battery.

2. The method as claimed in claim 1, wherein the adjusting at least one of the first and second thresholds includes determining a driving behavior selected from a first driving type and a second driving type, the second driving type engaging the battery more than the first driving type, by comparison of at least one predetermined driving threshold with at least one driving information item.

3. The method as claimed in claim 2, wherein when the determined driving behavior is of the second driving type, the first threshold and/or the second threshold are/is lowered by the adjusting.

4. The method as claimed in claim 2, wherein when the determined driving behavior is of the first driving type, the first and/or second thresholds are/is adjusted upwardly by the adjusting so as to reduce energy expenditure of the vehicle.

5. The method as claimed in claim 1, wherein the adjusting at least one of the first and second thresholds includes determining a state of the battery, including an age of the battery or a state of health of the battery.

6. The method as claimed in claim 5, wherein the adjusting includes interrogating a table of which an input is the determined state of the battery, said table providing at an output a new first threshold to be used in the cooling and/or a new second threshold to be used in the stopping the cooling.

7. The method as claimed in claim 1, further comprising:
    determining a loss of theoretical capacity of the battery, the adjusting at least one of the first and second thresholds taking into consideration said loss of theoretical capacity.

8. The method as claimed in claim 7, wherein, the battery having a guaranteed service life determined by theoretical conditions of use of the battery, the adjusting includes comparing the determined loss of real capacity and of the determined loss of theoretical capacity, such that the adjustment of at least one of the first and second thresholds ensures the guaranteed service life.

9. A motor vehicle, comprising:
    a battery,
    at least one temperature sensor or monitor configured so as to measure a value representative of the temperature of the battery,
    a system for cooling the battery, and
    a calculation system connected to the temperature sensor and to the cooling system and comprising software and/or hardware to:
        cool the battery, via the cooling system, when a data item representative of the temperature of the battery exceeds a first threshold,
        stop the cooling of the battery when the data item representative of the temperature of the battery drops below a second threshold, the second threshold being lower than the first threshold,
        determine a loss of real capacity of the battery by determining, over a time range, states of charge and temperature of the battery during operation and a percentage of time over the time range that the battery operated at each of the states of charge and temperature, and
        adjust at least one of the first and second thresholds depending on said loss of real capacity of the battery.

10. A non-transitory data storage medium readable by a computer, on which a computer program that, when executed by a computer, causes the computer to execute:
    cooling a battery when a data item representative of a temperature of the battery exceeds a first threshold,
    stopping the cooling of the battery when the data item representative of the temperature of the battery drops below a second threshold, the second threshold being lower than the first threshold,
    determining a loss of real capacity of the battery by determining, over a time range, states of charge and temperature of the battery during operation and a percentage of time over the time range that the battery operated at each of the states of charge and temperature, and
    adjusting at least one of the first and second thresholds depending on said loss of real capacity of the battery.

* * * * *